Sept. 1, 1925.
L. ROVINSKY ET AL
1,551,911
ELECTRICAL ICE CREAM DISPENSER
Filed May 29, 1925
2 Sheets-Sheet 2
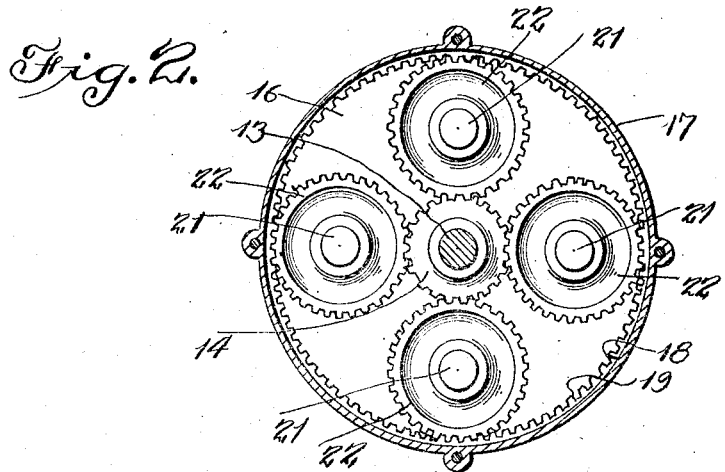
Fig. 2.
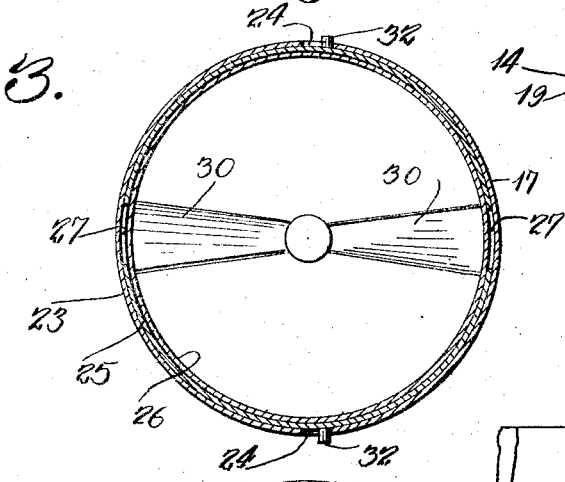
Fig. 3.
Fig. 7.
Fig. 5.
Fig. 4.
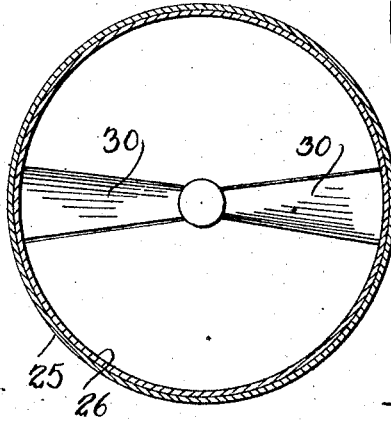
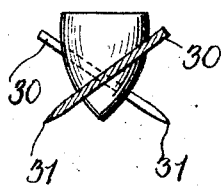
Fig. 6.
INVENTORS
Leon Rovinsky &
BY Norman Horton.
Watson E. Coleman
ATTORNEY Patented Sept. 1, 1925.

1,551,911

UNITED STATES PATENT OFFICE.

LEON ROVINSKY AND NORMAN HORTON, OF HUGO, OKLAHOMA.

ELECTRICAL ICE-CREAM DISPENSER.

Application filed May 29, 1925. Serial No. 33,761.

*To all whom it may concern:*

Be it known that we, LEON ROVINSKY and NORMAN HORTON, citizens of the United States, residing at Hugo, in the county of Choctaw and State of Oklahoma, have invented certain new and useful Improvements in Electrical Ice-Cream Dispensers, of which the following is a specification, reference being had to the accompanying drawings.

This invention relates to an electrical ice cream dispenser and more particularly to a device for removing ice cream and especially hard ice cream from the ordinary counter container and packing it in pint and quart containers to be delivered to the purchaser.

An important object of the invention is to provide a device of this character in which the construction is such that a change is readily effected from one size container to another and in which the parts may be very readily cleansed.

A still further object of the invention is the provision of a device of this character which may be readily manipulated and will not occupy much space when not in use and which will be durable and efficient in service.

These and other objects we attain by the construction shown in the accompanying drawings, wherein for the purpose of illustration is shown a preferred embodiment of our invention and wherein:—

Figure 2 is a section on the line 2—2 of Figure 1;

Figure 3 is a section on the line 3—3 of Figure 1;

Figure 4 is a section on the line 4—4 of Figure 1;

Figure 5 is a fragmentary side elevation of the upper end of the container holder and container showing the spaces provided to permit engagement of the container;

Figure 6 is a section on the line 6—6 of Figure 1; and

Figure 7 is a detailed sectional view through the sun gear of the planetary train.

Figure 1:
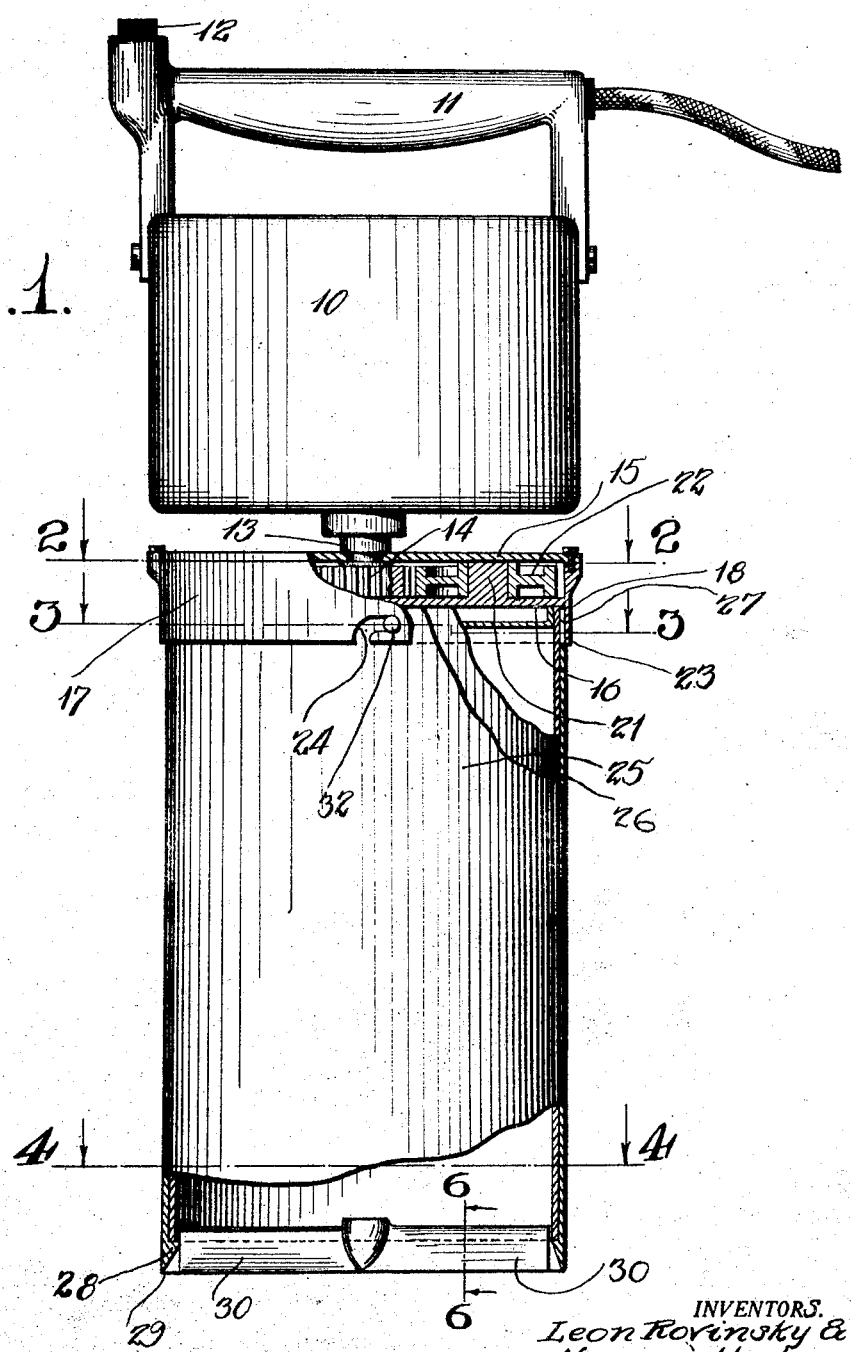
Figure 1 is a side elevation partially in section of an ice cream dispensing device constructed in accordance with our invention.

Referring now more particularly to the drawings, the numeral 10 indicates a suitable motor, the frame of which has attached thereto a handle 11 in which is mounted a switch 12 controlling the passage of current to the motor. This motor has secured to the armature shaft 13 thereof a pinion 14.

This pinion is secured in position upon the shaft 13 between upper and lower walls 15 and 16 of a flat disk-like gear case 17, the upper wall of which is in the form of a removable cover and the outer wall 18 of which has formed upon its inner face an internal gear 19. The shaft is rotatably directed through both the upper and lower walls and the case is rotatably secured in position upon the shaft, as at 20. One wall of the case has secured thereto a plurality of stub shafts 21 on which are mounted gears 22 meshing with the pinion 14 and with the internal gear 19 and combining therewith to form a planetary train by means of which the gear case is driven at a reduced speed. The gear case is provided with a depending skirt 23 having bayonet slots 24.

The carton containers and filling devices each comprise a cylinder 25 of the proper length to receive a container 26, the cylinder having an open top through which the container 26 is introduced and being notched at this top, as at 27 to permit engagement of the container with the fingers so that the container may be withdrawn. Interiorily, at its lower end, the cylinder is formed with an upwardly facing shoulder 28 upon which the lower end of the wall of the container engages. The inner wall of the cylinder from this shoulder slopes downwardly and outwardly to the outer wall, as at 29, and upon this downwardly and outwardly sloping portion is secured the ends of radially extending knives 30, each arranged at an angle to the vertical and having their lower edges arranged in approximate plane of the lower edge of the cylinder and sharpened, as indicated at 31. These sharpened edges will, of course, be in advance of the direction of rotation and the severed cream which will then be forced upwardly by the remainder of the blade into the container 26. The upper end of the cylinder is formed with pressed or other suitably formed lugs 32 for engagement in the bayonet slots 24, the slots being, of course, so formed that resistance to rotation of the cylinder tends to more firmly engage the cylinder in these slots.

In the operation of the device, the proper cylinder 25 is selected and the container placed therein so that it comes to rest upon the shoulder 28 after which the cylinder is engaged with the flange 23 of the gear case and the device is ready for operation. With the motor started, the lower end of the cylinder is engaged with the cream in the can and the knives will sever the cream and cause the same to be forced upwardly into the container, it being understood that the operator at this time is exerting downward pressure upon the cylinder through the handle 11 of the motor. As the container fills, the knives will act to bring pressure to bear against the cream within the container to pack the same with the result that the container becomes fully packed. This is very desirable for with the type of container illustrated, it is a common practice to unwind the material of the container from about the cream and then slice the loaf of cream thus left for serving. While I have referred to a plurality of cylinders but one of these is illustrated for the reason that the remaining cylinders will be of the same construction as that illustrated with the exception of the fact that one will be adapted for the reception of pint containers while the other will be adapted for the reception of quart containers.

Since the structure of the device is capable of a certain range of change and modification without materially departing from the spirit of our invention, we do not limit ourselves to such specific structure except as hereinafter claimed.

We claim:—

1. In a device for dispensing ice cream, a motor, a planetary gear train supported from the armature shaft of the motor and including a housing formed interiorly to provide an orbit gear, a carton container detachably engaged with said housing; the interior of the carbon container having adjacent the outer end thereof means for limiting the movement of a carton into the container from the housing engaging end of the carton container and means carried by the outer end of the carton container for severing cream upon rotation of the carton container to deliver the same into a carton disposed within the container and to pack the same therein.

2. In a device for dispensing ice cream, a motor, a planetary gear train supported from the armature shaft of the motor and including a housing formed interiorly to provide an orbit gear, a carton container detachably engaged with said housing; the interior of the carton container having adjacent the outer end thereof means for limiting the movement of a carton into the container from the housing engaging end of the carton container and knives carried by the outer end of the carton container for severing cream upon rotation of the carton container to deliver the same into a carton disposed within the container and to pack the same therein, said knives extending radially of the lower end of the container and each having its sharpened edge disposed downwardly and its upper surface inclining upwardly to thereby provide a vane for engaging the cream and forcing the same into the container.

3. In a device of the type described, a motor, a planetary gear train operating from the armature shaft of the motor and including a housing for the train formed interiorly to provide the orbit gear of the train, the housing having a depending skirt, a cylindrical carton container having at its upper end bayonet slot engagement with the skirt of the housing whereby it may be removed to permit insertion of a carton therein, the lower end of the cylinder having means for severing material and forcing the same into a contained carton, the upper end of the cylinder being notched to permit engagement of the fingers with a contained carton.

4. In a device of the type described, a motor, a planetary gear train operating from the armature shaft of the motor and including a housing for the train formed interiorly to provide the orbit gear of the train, the housing having a depending skirt, a cylindrical carton container having at its upper end bayonet slot engagement with the skirt of the housing whereby it may be removed to permit insertion of a carton therein, the lower end of the cylinder having means for severing material and forcing the same into a contained carton, the upper end of the cylinder being notched to permit engagement of the fingers with a contained carton, the interior of the cylinder adjacent the lower end thereof having a shoulder checking movement of a carton into the cylinder.

In testimony whereof we hereunto affix our signatures.

LEON ROVINSKY.
NORMAN HORTON.